United States Patent
Ogata et al.

(10) Patent No.: US 9,879,145 B2
(45) Date of Patent: Jan. 30, 2018

(54) HIGH-QUALITY/HIGH-DEFINITION SCREEN PRINTING INK COMPOSITION FOR GLASS SUBSTRATE, PRINTED PRODUCT OBTAINED BY SCREEN PRINTING SAID INK COMPOSITION, AND MANUFACTURING METHOD FOR SAID PRINTED PRODUCT

(71) Applicant: Teikoku Printing Inks Mfg. Co., Ltd., Tokyo (JP)

(72) Inventors: Tomomi Ogata, Tokyo (JP); Takuya Torihata, Tokyo (JP); Naoto Takada, Tokyo (JP)

(73) Assignee: Teikoku Printing Inks Mfg. Co. Ltd., Tokyo (JP)

( * ) Notice: Subject to any disclaimer, the term of this patent is extended or adjusted under 35 U.S.C. 154(b) by 11 days.

(21) Appl. No.: 15/302,244

(22) PCT Filed: Jan. 26, 2016

(86) PCT No.: PCT/JP2016/052093
§ 371 (c)(1),
(2) Date: Oct. 6, 2016

(87) PCT Pub. No.: WO2016/121724
PCT Pub. Date: Aug. 4, 2016

(65) Prior Publication Data
US 2017/0233593 A1     Aug. 17, 2017

(30) Foreign Application Priority Data
Jan. 27, 2015 (JP) ................. 2015-013207

(51) Int. Cl.
| C09D 11/033 | (2014.01) |
| C09D 11/037 | (2014.01) |
| C09D 11/102 | (2014.01) |
| C09D 11/104 | (2014.01) |
| C09D 11/106 | (2014.01) |
| C09D 11/107 | (2014.01) |
| B41M 1/34 | (2006.01) |
| B41F 15/00 | (2006.01) |

(52) U.S. Cl.
CPC ............ *C09D 11/033* (2013.01); *B41F 15/00* (2013.01); *B41M 1/34* (2013.01); *C09D 11/037* (2013.01); *C09D 11/102* (2013.01); *C09D 11/104* (2013.01); *C09D 11/106* (2013.01); *C09D 11/107* (2013.01)

(58) Field of Classification Search
CPC ... C09D 11/033; C09D 11/037; C09D 11/102; C09D 11/104; C09D 11/106; C09D 11/107; B41M 1/34
USPC ............ 106/31.31, 31.6, 31.85, 31.86, 31.88
See application file for complete search history.

(56) References Cited

U.S. PATENT DOCUMENTS

2009/0258202 A1* 10/2009 Sakaguchi ............. C09D 11/52
106/31.92

FOREIGN PATENT DOCUMENTS

| JP | 1992-268381 A | 9/1992 |
| JP | 2003-238876 A | 8/2003 |
| JP | 2003-281936 A | 10/2003 |
| JP | 2005-314632 A | 10/2005 |
| JP | 2007-107057 A | 4/2007 |
| JP | 2003-294930 A | 2/2009 |
| JP | 2010-47649 A | 3/2010 |
| JP | 2010-47716 A | 3/2010 |
| JP | 2010-222404 A | 10/2010 |
| JP | 2012-17411 A | 1/2012 |
| WO | 2014/104053 A1 | 7/2014 |
| WO | 2014/136924 A1 | 9/2014 |
| WO | WO 2016/121141 A1 * | 8/2016 |
| WO | WO 2016/121220 A1 * | 8/2016 |
| WO | WO 2016/121726 A1 * | 8/2016 |

OTHER PUBLICATIONS

English translation of the Written Opinion of the International Search Authority dated Apr. 26, 2016 for PCT/JP2016/052093; 4 pages.*
English translation of JP 2010/222404, Oct. 2010; 12 pages.*

* cited by examiner

*Primary Examiner* — Helene Klemanski
(74) *Attorney, Agent, or Firm* — Richard M. Goldberg

(57) ABSTRACT

An ink composition for screen printing for a glass substrate includes a solvent with a boiling point at least 170° C. at least at 70 mass % of the total solvent and a prepolymer or polymer with a weight-average molecular weight of at least 2000 at least at 2 mass % with respect to total ink composition, and with a viscosity of 5 to 180 Pa·s measured with a BH-type rotating viscosimeter at 25° C. and thixotropic index (TI value) of 2.0 to 8.0, the measured flow radius value being 13.0 to 24.0 mm after 1 minute from start of measurement by a flow property measuring method using a spread meter at 25° C. according to JIS K5701-1:2000, satisfying "F60"–"F45"≤1.0 mm, where "F60" and "F45" are measured flow radius values after 1 minute and 45 seconds, respectively, from start of measurement, and containing a coupling agent compound.

8 Claims, No Drawings

HIGH-QUALITY/HIGH-DEFINITION SCREEN PRINTING INK COMPOSITION FOR GLASS SUBSTRATE, PRINTED PRODUCT OBTAINED BY SCREEN PRINTING SAID INK COMPOSITION, AND MANUFACTURING METHOD FOR SAID PRINTED PRODUCT

TECHNICAL FIELD

The present invention relates to an ink composition for high-quality/high-definition screen printing for a glass substrate that allows high-precision printing of both fine patterns such as fine dot patterns or fine line patterns in particular on a glass substrate, and wide-area solid patterns, simultaneously in a single step by screen printing, which is a method widely used for image pattern formation in the field of graphics and electric and electronic part-related fields, as well as relates to printed matter produced by the screen printing ink composition and relates to a method for producing the printed matter.

BACKGROUND ART

In recent years, in fields relating to graphic decorative printed matter such as vehicle interior device control panels, household electrical appliance labels and designs on tablet device frames and enclosures, demands are increasing for more convenient and low-cost production of printed matter with greater diversity of design and increasingly high definition, having both fine patterns (for example, dot patterns with diameters of about 100 μm, or fine line patterns), and wide-area solid patterns. There is also a demand for higher quality and higher definition of the visibility of printed images that comprise both fine patterns and solid patterns, by improving the sharpness of the image edge sections in solid patterns while also obtaining a satisfactory leveling property.

Moreover, in the fields of black stripe or black matrix printing, as a type of graphics decoration in electric or electronic fields, there is a demand for obtaining a high degree of definition that provides sharpness to the printed images without bleeding or spreading, in addition to stable printing of fine lines, and there is a desire to be able to accomplish high definition printing with satisfactory visibility in a single step regardless of the size of the printed area, for cost reduction.

In addition, glass substrates are becoming widely used as printed objects in these fields, and various types of glass substrates have come into use for glass substrates, including untreated glass, antifog-treated glass, tempered glass, anti-reflection-treated glass, thermal ray blocking-treated glass, colored glass and ITO conductive film-treated glass, while the printing surface conditions of glass substrates (such as the wetting index) are also becoming diversified. Still, a strong demand exists for a high-quality/high-definition screen printing ink for glass substrates that can be used for glass substrates having such a variety of surface conditions, while retaining satisfactory adhesion and durability, and having stable printing properties for fine lines, as well as a high degree of sharp high definition without bleeding or spreading in printed images, and also allowing high definition printing with satisfactory visibility in a single step regardless of the size of the printed area.

In conventional screen printing, when printing a dot pattern or fine line pattern of approximately 100 μm, printing is usually performed using a high-viscosity screen printing ink of about 10 to 200 Pa·s, with a reduced flow property, but printing of solid patterns with such high-viscosity screen printing inks cannot avoid creation of leveling defects or printing abnormalities in the solid patterns due to the poor flow property, and as a result the visibility of the printed matter is impaired. Furthermore, when a low-viscosity screen printing ink of several Pa·s is used for satisfactory printing of solid patterns, it has been impossible to avoid spreading of ink that may exceed about 50 to 100 μm at the solid pattern image edge sections, or enlargement, spreading or bleeding of fine patterns, that impair the visibility of the printed matter, and therefore screen printing of fine patterns and solid patterns is performed separately with different inks suitably prepared for each, and it has been difficult to produce printed matter comprising both fine patterns and solid patterns in a single step of screen printing.

Ink jet printing, on the other hand, is considered to allow high-precision printing of printed matter comprising both fine patterns and solid patterns in a single step, and many attempts have been made to accomplish high-quality/high-definition printing by ink jet printing, however, since ink jet printing involves spraying ink droplets from a head nozzle with a diameter of about 30 μm, which spread out to about 50 μm at minimum when the droplets impact with the object being printed, it has been the case that such printing lacks sharp linearity especially at image edge sections.

Offset printing is another printing system that allows creation of high-quality/high-definition printed matter, however, since the structure of the printing plate is mesh-like, resulting in the printed images that are aggregated prints of halftone dots, it has been impossible to avoid a lack of sharp linearity at image edge sections, similar to ink jet printing, while the printing film thickness is also thin at about 1 to 2 μm, and when compared to screen printed matter, it is inferior in terms of high film thickness, high durability, high weather resistance and high chemical resistance, as well as firm adhesion to various objects to be printed and versatile functionality, such that it is unsuitable for creation of printed matter that requires durability and functionality, such as vehicle interior device control panels and household electrical appliance labels, designs on tablet device frames and enclosures, and light modulated black stripes and black matrices.

Prior Patent Document 1 (Japanese Unexamined Patent Application Publication No. 2010-047716) and Prior Patent Document 2 (Japanese Unexamined Patent Application Publication No. 2010-047649) each disclose a conductive ink composition and conductive coating film for screen printing that can form high-definition patterns, but techniques relating to the flow property of ink for printing with both fine patterns and solid patterns have not been pursued, and therefore while fine patterns can be obtained with satisfactory printing precision, in the case of solid patterns, the leveling property is poor and printing abnormalities are generated. Furthermore, the technical scope of Prior Patent Document 1 relates only to printing of fine patterns with the conductive ink composition. Moreover, they do not disclose any technique relating to a screen ink composition printed with high precision onto various different types of glass substrates.

In addition, Prior Patent Document 3 (Japanese Unexamined Patent Application Publication No. 2003-238876) and Prior Patent Document 4 (Japanese Unexamined Patent Application Publication No. 2003-294930) disclose ink compositions for screen printing that allow formation of high-definition patterns, but as with Prior Patent Document 1, the disclosures are of techniques for highly precise printing of fine patterns but not of technology relating to ink compositions for simultaneous printing of solid patterns in a single step. Moreover, they do not disclose any technique relating to a screen ink composition printed with high precision onto various different types of glass substrates.

CITATION LIST

Patent Document

[Prior Patent Document 1] Japanese Unexamined Patent Application Publication No. 2010-047716
[Prior Patent Document 2] Japanese Unexamined Patent Application Publication No. 2010-047649
[Prior Patent Document 3] Japanese Unexamined Patent Application Publication No. 2003-238876
[Prior Patent Document 4] Japanese Unexamined Patent Application Publication No. 2003-294930

SUMMARY OF THE INVENTION

Problems to be Solved by the Invention

The present invention has been achieved with consideration of the problems described above, and it relates to an ink composition for high-quality/high-definition screen printing that allows printing of both fine patterns such as fine dot patterns or fine line patterns, and wide-area solid patterns, simultaneously in a single step by screen printing, which has been considered impossible to achieve by conventional screen printing, as well as to printed matter produced by the screen printing ink composition and to a method for producing the printed matter, and in particular it relates to a high-quality/high-definition screen printing ink composition that, when printed onto glass substrates, can yield printed matter having excellent linearity of edges, and relates to a method for producing printed matter.

The invention relates to an ink composition for screen printing for a glass substrate, comprising an ink composition for high-quality/high-definition screen printing that, when producing printed matter by screen printing onto a glass substrate using a 360-mesh screen printing plate formed by a high-strength, non-deforming stainless steel mesh with a filament diameter of 25 μm, produces printed matter with a printed image edge spreading width of not more than 10 μm from the image design dimensions of the printing plate, wherein the ink composition for screen printing containing a solvent with a boiling point of not less than 170° C. at not less than 70 mass % of the total solvent and a prepolymer or polymer with a weight-average molecular weight of not less than 2000 at not less than 2 mass % with respect to the total ink composition, and with a viscosity of 5 to 180 Pa·s as measured with a BH-type rotating viscosimeter at 25° C., and a thixotropic index (TI value) of 2.0 to 8.0, the measured flow radius value of the ink composition being 13.0 to 24.0 mm after 1 minute from the start of measurement by a flow property measuring method using a spread meter at 25° C. according to JIS K5701-1:2000, satisfying "F60"–"F45"≤1.0 mm, where "F60" is defined as the measured flow radius value after 1 minute and "F45" is defined as the measured flow radius value after 45 seconds from the start of measurement by the flow property measuring method using the spread meter, and containing a coupling agent compound.

Effect of the Invention

With the ink composition for screen printing for a glass substrate according to the invention, it has become possible to print fine patterns and large-area solid patterns with high quality and high definition by screen printing, with a single screen printing step, onto glass substrates as printed matter having sufficient adhesion and durability.

BEST MODE FOR CARRYING OUT THE INVENTION

As is mentioned above, the invention relates to an ink composition for screen printing for a glass substrate, which is an ink composition for high-quality/high-definition screen printing that, when producing printed matter by screen printing onto a glass substrate using a 360-mesh screen printing plate formed by a high-strength, non-deforming stainless steel mesh with a filament diameter of 25 μm, produces decorative printed matter with a printed image edge spreading width of not more than 10 μm from the image design dimensions of the printing plate, the ink composition for screen printing containing a solvent with a boiling point of not less than 170° C. at not less than 70 mass % of the total solvent and a prepolymer or polymer with a weight-average molecular weight of not less than 2000 at not less than 2 mass % with respect to the total ink composition, and having a viscosity of 5 to 180 Pa·s as measured with a BH-type rotating viscosimeter at 25° C., and a thixotropic index of 2.0 to 8.0, the measured flow radius value of the ink composition being 13.0 to 24.0 mm after 1 minute from the start of measurement by a flow property measuring method using a spread meter at 25° C. according to JIS K5701-1:2000, satisfying "F60"–"F45"≤1.0 mm, where "F60" is defined as the measured flow radius value after 1 minute and "F45" is defined as the measured flow radius value after 45 seconds from the start of measurement by the flow property measuring method using the spread meter, and containing a coupling agent compound.

A "glass substrate," according to the invention, is any of various types of glass substrates such as untreated glass, antifog-treated glass, tempered glass, anti-reflection-treated glass, thermal ray blocking-treated glass, colored glass and ITO conductive film-treated glass.

Also, as combinations of solid image patterns and fine line image patterns according to the invention, there may be mentioned printed images that are dot patterns of about 50 to 100 μm, fine line patterns of about 50 to 100 μm, any of various solid patterns with an area of about not less than 25 cm$^2$, and combinations of these that are adjacent across spacings of about 30 to 150 μm.

The invention is also an ink composition for screen printing for a glass substrate according to Claim 1, wherein the surface tension of the ink composition is 23.0 to 36.0 dyn/cm as the value measured with a liquid surface tension meter.

An example of a liquid surface tension meter is "Model CBVP-Z automatic surface tension meter by Kyowa Interface Science Co., Ltd."

The invention is still further an ink composition for screen printing for a glass substrate, wherein the solvent of the ink composition includes butylcellosolve acetate and/or dialkyl adipate ester.

The invention still further relates to an ink composition for screen printing for a glass substrate, wherein the ink composition contains at least one coloring material, extender pigment and filler, either of one type or multiple types, or a combination thereof, the coloring material, extender pigment and filler are dispersed in the ink composition with a mean particle size of not more than 35 μm.

The invention still further relates to an ink composition for screen printing for a glass substrate that is an ink composition for graphic decorative screen printing.

The invention still further relates to an ink composition for screen printing for a glass substrate that is an ink composition for screen printing to be used for black matrix, black stripe, resist pattern, spacer or light guiding panel dot formation.

The invention still further relates to an ink composition for screen printing wherein the ink composition is an ink composition for screen printing for a glass substrate that is to be printed onto a glass substrate having a measured wetting test solution value of 32.0 to 60.0 dyn/cm.

The measured wetting test solution value is measured according to JIS K 6768:1999.

The invention still further relates to printed matter produced by the screen printing ink composition for screen printing onto a glass substrate.

The invention still further relates to a method for producing printed matter, wherein printed matter is produced by the screen printing ink composition for screen printing for a glass substrate onto a glass substrate.

The ink composition for screen printing for a glass substrate of the invention contains a solvent with a boiling point of not less than 170° C., at not less than 70 mass % of the total solvent. If the solvent with a boiling point of not less than 170° C. is not present in an amount of at least 70% of the total solvent, rapid ink drying on the screen printing plate will cause clogging due to an ink-dried coating on the screen printing plate, and defects will be produced in the fine pattern or at the solid image edge sections, making it impossible to obtain a high-definition printed matter with high quality.

There are no particular restrictions on solvents other than the solvent with a boiling point of not less than 170° C. to be present in the ink composition for screen printing for a glass substrate of the invention, but in order to attenuate the evaporation rate of the solvent with a boiling point of not less than 170° C., by azeotropic evaporation, and obtain more satisfactory stability of the screen printing ink composition on the screen plate, it is preferred to use solvents whose boiling points are not below 100° C.

The solvent with a boiling point of not less than 170° C. according to the invention may be an organic solvent such as butylcellosolve acetate, dialkyl adipate ester, isophorone, 3-methoxy-3-methylbutanol, 3-methoxy-3-methylbutyl acetate, coal tar naphtha with a boiling point of not less than 170° C., diethyleneglycol monoethyl ether (acetate), diethyleneglycol monobutyl ether (acetate) or triethyleneglycol monobutyl ether (acetate), and/or a (meth)acrylate monomer, vinyl ether monomer or amide monomer that hardens under activating energy rays.

Particularly among these, solvents including butylcellosolve acetate and dialkyl adipate ester are preferable, and they have good solubility for the resins in the ink composition, and good wettability on a variety of surfaces of glass substrates. A solvent including a dialkyl adipate ester is commercially available under the trade name Flexisolv DBE, by Invista.

Preferred examples of solvents whose boiling point is not below 100° C., according to the invention, include xylene, cyclohexanone, coal tar naphtha with a boiling point of 160 to 170° C., mineral spirits with a boiling point of 150 to 170° C., 1-methoxy-2-propanol, 1-methoxypropyl-2-acetate and diacetone alcohol.

The solvent of the invention needs only contain not less than 70 mass % of a solvent with a boiling point of not less than 170° C. among the total solvent, but in order to further stabilize the screen printing properties for fine patterns, the boiling point of the solvent is preferably not less than 190° C.

However, since using mineral oil or vegetable oil with a boiling point exceeding 250° C. as the solvent results in a poor drying property of the printed coating film, when a solvent having a boiling point of not less than 250° C. is used, it is preferably used at not more than 25 mass % of the total solvent amount.

In addition, the ink composition for screen printing for a glass substrate of the invention contains at least a prepolymer or polymer with a weight-average molecular weight of not less than 2000, as a binder resin, at not less than 2 mass % with respect to the total ink composition.

If the weight-average molecular weight of the prepolymer or polymer is less than 2000, problems such as weak adhesion or durability of the printed coating film onto glasses will result, while if the weight-average molecular weight exceeds 200000, the solubility in solvents will be poor and a greater amount of time and labor will be necessary for production of the ink composition. Therefore, a more preferred weight-average molecular weight range is about 4000 to 100000.

If the content of the prepolymer or polymer with a weight-average molecular weight of not less than 2000 is less than 2 mass % with respect to the total ink composition, this may lead to reduced adhesion and durability of the printed coating film onto glass substrates, and undesirable results such as leveling defects and pinhole generation in the printed coating film, due to poor dispersion of the coloring agent. If it exceeds 70 mass %, on the other hand, the viscosity may become too high making it difficult to accomplish uniform screen printing, or the mixing ratio of the solvent with a boiling point of not less than 170° C. will be lower, tending to result in easier drying of the ink on the screen printing plate and tending to result in clogging of fine patterns. Therefore, a more preferred content is about 5 to 70 mass % of the total ink composition, an even more preferred range being 10 to 70 mass % and the most preferred range being 15 to 60 mass %, as preferred ranges even for use as an ink for graphic decorative screen printing.

The prepolymer or polymer of the invention has a weight-average molecular weight of not less than 2000, and there are no particular restrictions on the type or mixing ratio as long as the content is not less than 2 mass % with respect to the total ink composition and up to a content that allows dissolution in the solvent in the ink composition and not more than of 70 mass %, although it is desirable to avoid highly hazardous harmful substances, such as substances that are strongly toxic for humans or organisms or substances that create a high environmental load.

Examples for the prepolymer include urethane acrylates, polyester acrylates and epoxy acrylates that harden by activating energy rays, such polymers including polyester resins, various types of modified polyester resins such as urethane-modified polyester resins, epoxy-modified polyester resins and acryl-modified polyester resins, vinyl chloride-vinyl acetate copolymer resins, butyral resins, polyether-urethane resins, polyester-urethane resins, polycarbonate-urethane resins, epoxy resins, phenol resins, acrylic resins, polyamide resins, polyamideimide resins, polyolefin resins, chlorinated polyolefin resins, chlorinated rubber, melamine resins, urea resins, modified cellulose resins such as ethyl cellulose resin, nitrocellulose resins, cellulose acetate butyrate (CAB) and cellulose acetate propionate (CAP), rosin resins, maleic acid resins, natural resins and alkyd resins, any of which may be used alone or in combination.

Polyester resins and epoxy resins are preferred among these resins, and branched polyester resins is particularly preferred, from the viewpoint of adhesion and durability with glass substrates.

The coupling agent compound of the invention is a component necessary for ensuring adequate adhesion and durability after the printing ink composition has formed a high quality/high-definition image coating film on the glass substrate by printing and heat drying. Examples of the coupling agent compounds include silane-based coupling agents, titanate-based coupling agents, aluminate-based coupling agents, phosphorus-based coupling agents and the like, and compounds that have a hydrolyzable group such as chlorine, methoxy, ethoxy, methoxyethoxy or acetoxy at one end and have an organic functional group such as amino, vinyl, methacryl, isocyanate or mercapto at the other end, and that react or are compatible with resins, may be used.

The KBM Series and KBE Series available from Shin-Etsu Chemical Co., Ltd., titanate-based coupling agents include the ORGATIX Series available from Matsumoto Fine Chemical Co., Ltd., and aluminate-based coupling agents include the PLENACT Series available from Ajinomoto Fine-Techno Co. Inc., may be list up as silane-based coupling agents and they may be used alone or jointly.

The using amount of coupling agent is preferably 0.1 to 5.0 mass % and more preferably 0.1 to 1.0 mass % with respect to the total amount of ink. If the amount is less than 0.1 mass %, it will not be possible to obtain adequate adhesion with glass substrates, and if it is not less than 5.0 mass %, the pot life during printing will be shortened and it will be poorly suited for mass production, while adhesion onto glass substrates will also be reduced.

The ink composition for screen printing for a glass substrate of the invention also has a viscosity of 5 to 180 Pa·s, and more preferably 50 to 120 Pa·s, as measured by a BH-type rotating viscosimeter. If the viscosity is less than 5 Pa·s, bleeding and spreading may occur in the fine patterns and solid image edge sections making it impossible to obtain a high-quality/high-definition printed image, while if the viscosity is not less than 180 Pa·s, the ink may not be uniform on the screen printing plate, or parting of the ink from the screen printing plate may be poor, producing abnormalities in solid images or creating defects in fine patterns or image edge sections.

The viscosity value measured by a BH-type rotating viscosimeter according to the invention is the measured value at 1 minute after the start of measurement at a rotor rotational speed of 20 rpm, with a No. 5 or No. 6 rotor for a viscosity range of 5 to 10 Pa·s, with a No. 6 or No. 7 rotor for a viscosity range of 10 to 50 Pa·s and with a No. 7 rotor for a viscosity range of not less than 50 Pa·s.

Also, the ink composition for screen printing for a glass substrate of the invention has a thixotropic index (TI value) of 2.0 to 8.0, the TI value being more preferably 4.0 to 7.0. If the TI value is less than 2.0, the ink flow property will increase, resulting in spreading in printed images with the passage of time after printing even if the viscosity is 180 Pa·s, such that fine patterns or image edge sections may become enlarged. If the TI value exceeds 8.0, the degree of protrusion of the ink from the screen printing plate will be excessive even if the viscosity is 5 Pa·s, such that bleeding may occur in fine patterns and at image edge sections making it impossible to obtain sharp printed images, or the flow property with time may be impaired, resulting in poor leveling especially on solid images.

The "TI value," for the purpose of the invention, is the ratio of the viscosity value with 2 rotations and the viscosity value with 20 rotations of the BH-type rotating viscosimeter at 25° C., or in other words, the value: [viscosity with 2 rotations of BH-type rotating viscosimeter/viscosity with 20 rotations of BH-type rotating viscosimeter]. The rotor used is a No. 5 to No. 7 rotor depending on the viscosity, according to the common method.

Furthermore, according to the invention, the ink composition has a measured flow radius value (hereinafter referred to as "flow value") of 13.0 to 24.0 mm after 1 minute from the start of measurement by a flow property measuring method using a spread meter at 25° C. according to JIS K5701-1:2000. It is more preferably 15.0 to 18.0 mm.

If the flow value is less than 13.0 mm, the ink will protrude from the screen printing plate with greater difficulty, requiring modifications such as increased printing pressure of the squeegee during screen printing, while if the flow value is not less than 24.0 mm, the degree of ink protrusion from the screen printing plate will tend to be greater and the ink will tend to flow and spread, thus requiring modifications such as lowering the printing pressure of the squeegee during screen printing.

Moreover, the flow value represents the radius value of ink that has flowed after 1 minute from the start of measurement with a spread meter as is mentioned above (hereinafter defined as "F60"), and if the radius value after 45 seconds from the start of measurement with a spread meter is defined as "F45," then the ink composition must be within the above-mentioned flow value range and the range of "F60"–"F45"≤1.0 mm must be satisfied, in order to obtain stable high quality/high definition printed images. Above mentioned items ground on that the ink must have a suitable flow property during printing, and after printing, the flow property must be such as to minimize large spread of spreading with the passage of time.

Most specifically, the present inventors found that the condition "F60"–"F45"≤1.0 mm, with the conditions for the flow value described in paragraph [0033], must be satisfied to obtain satisfactorily stable high quality/high definition printed images.

In already-mentioned Prior Patent Document 2 (Japanese Unexamined Patent Application Publication No. 2010-047649), only the difference in flow value at 10 seconds and 90 seconds with a spread meter as the slope value is disclosed, but the appropriate range for the flow value is not disclosed.

Also, the standard for judging printing suitability in Prior Patent Document 2 regulates merely image printing precision of ±5%, while it does not disclose the viewpoint of a microlevel judgment standard which is the standard used for high quality and high definition according to the invention, i.e. an edge spreading width of not more than 10 μm even at the edge sections of an image, when a printed image comprising a combination of a fine pattern image and a solid pattern image is printed by a single screen printing.

In the invention, the present inventors confirmed that when the flow value is less than the lower limit value of 13.0 mm as specified by the invention, even if "F60"–"F45"≤1.0 mm is satisfied, the flow property of the ink composition is insufficient tending to result in visible jaggedness at the printed image edge sections, and when the flow value is not less than the upper limit of 24.0 mm as specified by the invention, even if "F60"–"F45"≤1.0 mm is satisfied, the flow property of the ink composition increases excessively, resulting in a greater spreading width of the printed image edge sections, and the present invention has thereupon been completed.

In other words, the present inventors confirmed that, for creation of printed matter comprising a combination of solid patterns and fine patterns, it is possible to obtain a high degree of high quality/high definition printed image quality by screen printing in a single step with a combination wherein "F60"–"F45"≤1.0 mm is specified, while also specifying a suitable value of 13.0 to 24.0 mm for the flow value.

Needless to say, the viscosity and the TI value must also both be in the ranges specified above.

The ink composition of the invention is an ink composition for high-quality/high-definition screen printing for a glass substrate that at least, when printed matter is created by screen printing onto a glass substrate using a 360 mesh screen printing plate made with a high-strength, non-deforming stainless steel mesh having a filament diameter of 25 µm, can produce printed matter with a printed image edge spreading width of not more than 10 µm from the image design dimensions of the printing plate. If the printed image edge spreading width exceeds 10 µm, enlarged sections of the printed image with respect to the printing plate image design will be visibly apparent and the printed image will become visibly blurred, so that it may no longer be considered high-quality/high-definition decorative printing.

As is mentioned above, the ink composition for high-quality/high-definition screen printing can be prepared by containing at least a solvent with a boiling point of not less than 170° C. at not less than 70 mass % of the total solvent, containing at least a prepolymer or polymer with a weight-average molecular weight of not less than 2000 at not less than 2 mass % with respect to the total ink composition, and having at least a viscosity of 5 to 180 Pa·s as measured with a BH-type rotating viscosimeter at 25° C. and at least a thixotropic index of 2.0 to 8.0, the measured flow radius value of the ink composition being 13.0 to 24.0 mm after 1 minute from the start of measurement by a flow property measuring method using a spread meter at 25° C. according to JIS K5701-1:2000, satisfying "F60"–"F45"≤1.0 mm, with definition of "F60" as the measured flow radius value after 1 minute and definition of "F45" as the measured flow radius value after 45 seconds from the start of measurement by the flow property measuring method using the spread meter, and containing a coupling agent compound.

In addition, if the ink composition for high-quality/high-definition screen printing satisfies the "preferred conditions and/or desirable conditions" mentioned below, its production will be further facilitated and the high-quality and high-definition quality as printed matter may be improved.

Here, when the term "zero" µm is used for the printed image edge spreading width, it means complete absence of spreading of the printed ink and printing as prescribed by the image design on the printing plate, but since the printing plate exists in a state with a knitted screen mesh, even in cases where no spreading of the ink is present after printing there can be an effect of the presence of the screen mesh, tending to create minute chipping or jaggedness at the printed image edge sections. Therefore, the spreading width for decorative printing images is preferably 2 to 10 µm and more preferably 3 to 8 µm.

Preferred examples for the screen mesh, screen printing plate and screen printing conditions will now be described.

The 360 mesh screen mesh made of a high-strength, non-deforming stainless steel mesh may be HS-D360 by Asada Mesh Co., Ltd. (mesh filament diameter: 25 µmφ, calendered mesh thickness: 29 µm, open area ratio: 42%, strength index: 2.56 as indicated by Asada Mesh Co., Ltd.)

The printing plate is preferably a stainless steel/stainless steel combination plate, with an emulsion thickness of 7 to 20 µm using an appropriate commercially available photosensitive emulsion, and further flat-processed on the emulsion surface.

The screen printing conditions may be, as a preferred example, a squeegee with a 60 to 90 degree hardness, a clearance of 3 to 7 mm, pressing with a squeegee printing pressure of 1.5 to 2.0 mm, a squeegee angle of 50 to 80 degrees, a squeegee speed of 80 to 400 mm/sec and pressing with a scraper pressure of 1.0 to 2.0 mm.

Here, it is an essential condition for the ink composition for screen printing for a glass substrate of the invention that, at least for printed matter screen printed using a 360 mesh screen printing plate made of a high-strength, non-deforming stainless steel mesh with a filament diameter of 25 µm, it can produce printed matter with a printed image edge spreading width of not more than 10 µm from the image design dimensions of the printing plate, and therefore even when printed using a screen printing plate made of another type of screen mesh, if the ink composition for screen printing conforms to the necessary conditions of the invention, the ink composition for screen printing is within the technical scope of the invention.

Naturally, when using a screen printing plate made of a high-strength, non-deforming stainless steel mesh that exceeds 360 mesh (for example, 500 mesh, 640 mesh or 840 mesh), spreading of the printed image edges will be even further reduced and the printed image edge sections will be sharper.

The invention stands on also an ink composition for screen printing for a glass substrate according to Claim 1, wherein the surface tension of the ink composition is 23.0 to 36.0 dyn/cm as the value measured with a liquid surface tension meter. An example of a liquid surface tension meter is "Model CBVP-Z automatic surface tension meter by Kyowa Interface Science Co., Ltd."

The method for adjusting the surface tension of the ink composition be exampled by a method of adding a commercially available surface tension adjustor such as a Byk Series product provided by BYK Japan KK, or a method of adding a suitable amount of any of various fillers such as silica.

If the surface tension of the ink composition is less than 23.0 dyn/cm, the edge spreading width of printed images of the ink will tend to be greater for antifog-treated glass substrates having a wetting index of not less than 60 dyn/cm, and it may therefore be necessary of countermeasures such as to increase the ink viscosity or to carry out heat drying immediately after printing.

On the other hand, when the surface tension of the ink composition is not less than 36.0 dyn/cm, for glass substrates that have been subjected to anti-reflection treatment or the like and have a wetting index of less than 32.0 dyn/cm, craters or leveling defects will tend to be generated in the printed coating film, and therefore addition of additives such as crater-preventing agents, anti-cissing agents or leveling agents may be necessary.

Furthermore, when the ink composition for screen printing for a glass substrate of the invention contains at least one coloring material, extender pigment or filler, either of one type or multiple types, or a combination thereof, the coloring material, extender pigment and filler is preferably dispersed in the ink composition with a mean particle size of not more than 35 µm. When a coloring material, extender pigment or filler with a mean particle size exceeding 35 μm after dispersion is present, clogging of the mesh spacings of the 360 mesh screen printing plate may occur, potentially creating chipping and pinholes in the printed image.

There are no particular restrictions on the method for dispersing the coloring material, extender pigment and filler in the ink composition for screen printing for a glass substrate of the invention, and examples include dispersion using a blade-stirred disperser, bead disperser or triple roll disperser.

The coloring agent, extender pigment and filler are not particularly restricted, and examples of coloring agents include azo pigments, disazo pigments, bisazo pigments, phthalocyanine pigments, anthraquinone-based pigments, isoindoline pigments, dioxazine pigments, quinacridone pigments, perylene-based pigments, carbon black pigments, lake black pigments, perylene black pigments, aniline black pigments, iron oxide pigments, titanium pigments, zinc sulfide pigments and various chromatic color dyes, any one of which or two or more of which may be used, such coloring materials being preferably used in a mixing ratio of not more than 95 mass % with respect to the ink composition. The amount is preferably not more than 50 mass %.

Examples of extender pigments include (fine particulate) silica, talc, calcium carbonate, magnesium carbonate, bentonite, sedimentary barium sulfate, zinc oxide and alumina, any one or two or more in combination may be used, such extender pigments being preferably used in a mixing ratio of not more than 30 mass % with respect to the ink composition.

Examples of fillers include resin beads, metallic particles, metal powder, metal oxide powder, graphite, pearl pigment, fluorescent pigments, wax particles and protein powder. Also included are functional materials, such as ultraviolet absorbing materials, antimicrobial materials, heat absorbing materials, refractive index-modifying materials, slidability-imparting materials, slidability-preventing materials, phosphorescencent materials, polarizing materials, anti-reflection materials and diffusible materials. These may be used alone or in combinations of multiple types, and such fillers are preferably used in a mixing ratio of not more than 95 mass %, more preferably not more than 50 mass % and even more preferably not more than 30 mass %, with respect to the ink composition.

When the ink composition is used as an ink for graphic decorative screen printing, it is possible to produce high-definition graphic decorative screen printed matter of high quality, that has not been achievable with conventional screen printing, namely having excellent precision with excellent linearity of image edge sections and free of chipping or spreading in fine dots, and simultaneously exhibiting rich color shade expression and different types of functionality.

Furthermore, an ink composition for screen printing for a glass substrate of the invention containing the above-mentioned coloring agents, extender pigments and fillers is not limited to such graphic decorative screen printed matter, and can be used to produce high-definition screen printed matter even when used for printing onto electric and electronic parts, such as black matrix or stripe printing for increasing display visibility, pattern printing for function as a resist, spacer printing to avoid contact between members, or dot printing designed for specific area sizes, to ensure uniformity of luminance in light guiding panels.

Usually, black inks with a high masking property are usually used for black matrix or stripe printing, white inks, black inks, chromatic color inks, transparent inks, dispersive inks and/or the mixed inks are usually used for resist printing or spacer printing, and inks containing fillers with light diffusing functions such as silica or various types of beads, are usually used for light guiding panel dot printing.

The invention also provides printed matter produced by the screen printing ink composition for screen printing for a glass substrate onto a glass substrate.

The invention still further provides a method for producing printed matter, wherein printed matter is produced by the screen printing ink composition for screen printing onto a glass substrate.

In the printed matter and method for producing printed matter provided by the invention, the glass substrate used may be quartz glass, soda lime glass, non-alkaline glass, sapphire glass or chemically reinforced glass, or a glass substrate that has been subjected to antifog treatment, tempering treatment, anti-reflection treatment, thermal ray blocking treatment, coloring treatment, ITO conductive film treatment or the like on the surface.

Also, a characteristic of the ink composition is preferable in that printing is carried out onto a glass substrate having a measured wetting test solution value of 32.0 to 60.0 dyn/cm.

For example, for antifog-treated glass substrates having a wetting index of not less than 60 dyn/cm, the edge spreading width of printed images of the ink composition will tend to be greater, and it may therefore be necessary to further increase the ink viscosity or to carry out heat drying immediately after printing.

On the other hand, for glass substrates that have been subjected to anti-reflection treatment or the like and have a wetting index of less than 34.0 dyn/cm, craters or leveling defects will tend to be generated in the printed coating film, and therefore addition of additives such as crater-preventing agents, anti-cissing agents or leveling agents may be necessary.

Printing on the above-mentioned glass substrates is particularly preferred according to the invention, but it will usually be possible to obtain high quality/high-definition printed images even with printing on other substrates having printing surfaces with a wetting index in the same range as specified above. Examples of such substrates include art paper, coated paper, various types of synthetic paper, polyester (PET), polycarbonate (PC), acryl, polypropylene (PP), polyethylene (PE), vinyl chloride, and the like, which may be in the form of various flat substrates, sheet-like substrates or film-like substrates.

Examples

Examples and Comparative Examples of the invention are shown in [Table 1] below. However, the invention is not limited to these examples.

TABLE 1

|  | Example 1 | Example 2 | Example 3 | Example 4 | Example 5 | Example 6 |
|---|---|---|---|---|---|---|
| <Ink composition components> | | | | | | |
| Polyester resin (molecular weight: 6000) | 15.0 | | | | 15.0 | 25.0 |
| Polyester resin (molecular weight: 28000) | 14.0 | | | 20.0 | 20.0 | |

TABLE 1-continued

| | | | | | | |
|---|---|---|---|---|---|---|
| Acrylic resin (molecular weight: 100000) | | 5.0 | | 24.9 | | |
| Vinyl chloride-vinyl acetate copolymer resin (molecular weight: 47000) | | 5.0 | | | | 25.0 |
| Epoxy resin (molecular weight: 60000) | | | 54.0 | | | |
| Epoxy acrylate (molecular weight: 2000) | | | | | | |
| Isophorone (boiling point: 216° C.) | | 34.0 | | 27.0 | 10.0 | 14.0 |
| DBE (boiling point: 203-245° C.) | 25.0 | | 10.0 | | 15.0 | 2.0 |
| Butylcellosolve acetate (boiling point: 192° C.) | 10.0 | | | | 10.0 | |
| Coal tar naphtha (boiling point: 180-200° C.) | | | 7.5 | | | 2.0 |
| 1,6-Hexanediol diacrylate (boiling point: ≥200° C.) | | | | | | |
| Monofunctional epoxy acrylate monomer (boiling point: ≥200° C.) | | | | | | |
| 1-Methoxypropy1-2-acetate (boiling point: 146° C.) | | | | 3.0 | 4.0 | |
| 1-Methoxy-2-propanol (boiling point: 120° C.) | | | 3.0 | | 3.0 | |
| Cyclohexanone (boiling point: 156° C.) | | | | 7.0 | | 4.0 |
| Diacetone alcohol (boiling point: 168° C.) | | | 3.5 | | | |
| Silane coupling agent | 0.5 | 0.5 | 2.0 | 0.1 | 0.5 | 5.0 |
| Type of coloring agent, etc. | Carbon black | Titanium oxide | Quinacridone pink | Phthalocyanine blue | Diszao yellow | |
| Composition of coloring agent | 10.0 | 44.0 | 15.0 | 8.0 | 10.0 | |
| Photoinitiator | | | | | | |
| Surface tension adjustor, antifoaming agent, and additives such as leveling agent, etc. | 5.5 | 3.0 | 5.0 | 10.0 | 7.5 | 3.0 |
| Silica | 10.0 | 3.5 | | | 3.0 | 10.0 |
| Talc | 10.0 | 5.0 | | | 2.0 | 10.0 |
| <Total component weight ratio> | 100.0 | 100.0 | 100.0 | 100.0 | 100.0 | 100.0 |
| Surface tension of ink [dyn/cm] | 28.0 | 30.0 | 32.0 | 23.0 | 32.0 | 34.0 |
| Surface tension of glass substrate as object to be printed | 60.0 | 32.0 | 58.0 | 56.0 | 34.0 | 60.0 |
| <Physical property values> | | | | | | |
| Viscosity [Pa · s] | 70.0 | 5.0 | 180.0 | 60.0 | 30.0 | 100.0 |
| TI value [-] | 5.5 | 3.5 | 8.0 | 2.0 | 6.0 | 3.0 |
| Flow value [mm] | 16.0 | 24.0 | 13.0 | 16.0 | 19.0 | 15.0 |
| F60-F45 [mm] | 0.6 | 0.2 | 0.1 | 0.7 | 0.2 | 0.8 |
| Mean particle size of particles in ink [μm] | 25.0 | 15.0 | 25.0 | 35.0 | 20.0 | 10.0 |
| Image edge spreading width of 100 μm lateral fine line [μm] | 4.0 | 9.5 | 1.1 | 6.0 | 5.0 | 9.4 |
| Image edge spreading width of 100 mm square [μm] | 4.2 | 10.0 | 1.1 | 6.6 | 5.4 | 10.0 |
| <Printed image evaluation> | | | | | | |
| Evaluation of high-quality/high-definition property of 100 μmφ dot-printed linage | VG | G | G | G | VG | G |
| Evaluation of high-quality/high-definition property of 100 μm lateral fine line-printed image | VG | G | VG | G | VG | G |
| Evaluation of high-quality/high-definition property of 100 mm side-square solid image | VG | G | G | VG | VG | VG |
| Adhesion onto glass substrate | G | G | G | G | G | G |

| | Example 7 | Example 8 | Comp. Ex. 1 | Comp. Ex. 2 | Comp. Ex. 3 | Comp. Ex. 4 |
|---|---|---|---|---|---|---|
| <Ink composition components> | | | | | | |
| Polyester resin (molecular weight: 6000) | | 1.0 | 12.5 | 15.0 | | |
| Polyester resin (molecular weight: 28000) | | 1.0 | 12.5 | 14.0 | 5.0 | |
| Acrylic resin (molecular weight: 100000) | | | | | 20.0 | |
| Vinyl chloride-vinyl acetate copolymer resin (molecular weight: 47000) | | | | | | |
| Epoxy resin (molecular weight: 60000) | | | | | | |
| Epoxy acrylate (molecular weight: 2000) | 70.0 | | | | | 80.0 |
| Isophorone (boiling point: 216° C.) | | | | | 25.0 | |
| DBE (boiling point: 203-245° C.) | | 25.0 | 10.0 | 25.0 | | |
| Butylcellosolve acetate (boiling point: 192° C.) | | | | 10.0 | | |
| Coal tar naphtha (boiling point: 180-200° C.) | | 3.0 | 5.0 | | 24.0 | |
| 1,6-Hexanediol diacrylate (boiling point: ≥200° C.) | 5.0 | | | | | 3.0 |
| Monofunctional epoxy acrylate monomer (boiling point: ≥200° C.) | 10.0 | | | | | 7.0 |
| 1-Methoxypropy1-2-acetate (boiling point: 146° C.) | | | | | 5.0 | |
| 1-Methoxy-2-propanol (boiling point: 120° C.) | | 9.5 | | | | |
| Cyclohexanone (boiling point: 156° C.) | | | 15.0 | | 7.0 | |
| Diacetone alcohol (boiling point: 168° C.) | | | | | | |
| Silane coupling agent | 1.0 | 0.5 | | | 1.0 | 1.0 |
| Type of coloring agent, etc. | | Aluminum powder | Carbon black | Carbon black | Phthalocyanine green | |
| Composition of coloring agent | | 50.0 | 10.0 | 10.0 | 5.0 | |

TABLE 1-continued

|  | | | | | | |
|---|---|---|---|---|---|---|
| Photoinitiator | 5.0 | | | | | 4.0 |
| Surface tension adjustor, antifoaming agent, and additives such as leveling agent, etc. | 5.5 | 8.0 | 5.0 | 6.0 | 5.0 | 5.0 |
| Silica | 3.5 | 2.0 | 10.0 | 10.0 | 3.0 | |
| Talc | | | 20.0 | 10.0 | | |
| <Total component weight ratio> | 100.0 | 100.0 | 100.0 | 100.0 | 100.0 | 100.0 |
| Surface tension of ink [dyn/cm] | 36.0 | 26.0 | 34.0 | 28.0 | 38.0 | 32.0 |
| Surface tension of glass substrate as object to be printed | 40.0 | 34.0 | 58.0 | 60.0 | 34.0 | 56.0 |
| <Physical property values> | | | | | | |
| Viscosity [Pa · s] | 60.0 | 50.0 | 120.0 | 70.0 | 4.0 | 30.0 |
| TI value [-] | 5.0 | 7.0 | 6.0 | 5.5 | 3.0 | 1.0 |
| Flow value [mm] | 17.0 | 16.0 | 16.0 | 16.0 | 25.0 | 22.0 |
| F60-F45 [mm] | 1.0 | 0.4 | 0.5 | 0.6 | 1.0 | 1.2 |
| Mean particle size of particles in ink [μm] | 1.0 | 35.0 | 25.0 | 25.0 | 25.0 | 0.0 |
| Image edge spreading width of 100 μm lateral fine line [μm] | 9.0 | 5.0 | 6.0 | 4.0 | 20.0 | 25.0 |
| Image edge spreading width of 100 mm square [μm] | 9.5 | 5.6 | 6.3 | 4.4 | 30.0 | 40.0 |
| <Printed image evaluation> | | | | | | |
| Evaluation of high-quality/high-definition property of 100 μmφ dot-printed linage | VG | G | F | VG | F | P |
| Evaluation of high-quality/high-definition property of 100 μm lateral fine line-printed image | G | VG | F | VG | F | P |
| Evaluation of high-quality/high-definition property of 100 mm side-square solid image | G | VG | G | VG | F | F |
| Adhesion onto glass substrate | G | G | P | P | G | G |

|  | Comp. Ex. 5 | Comp. Ex. 6 | Comp. Ex. 7 | Comp. Ex. 8 |
|---|---|---|---|---|
| <Ink composition components> | | | | |
| Polyester resin (molecular weight: 6000) | | | | |
| Polyester resin (molecular weight: 28000) | | | | |
| Acrylic resin (molecular weight: 100000) | 5.0 | | 10.0 | 4.0 |
| Vinyl chloride-vinyl acetate copolymer resin (molecular weight: 47000) | 10.0 | | 10.0 | 4.0 |
| Epoxy resin (molecular weight: 60000) | | 34.0 | | |
| Epoxy acrylate (molecular weight: 2000) | | | | |
| Isophorone (boiling point: 216° C.) | 40.0 | | 40.0 | 45.0 |
| DBE (boiling point: 203-245° C.) | | 10.0 | 10.0 | |
| Butylcellosolve acetate (boiling point: 192° C.) | | | 10.0 | |
| Coal tar naphtha (boiling point: 180-200° C.) | | 7.5 | | |
| 1,6-Hexanediol diacrylate (boiling point: ≥200° C.) | | | | |
| Monofunctional epoxy acrylate monomer (boiling point: ≥200° C.) | | | | |
| 1-Methoxypropyl-2-acetate (boiling point: 146° C.) | | | | |
| 1-Methoxy-2-propanol (boiling point: 120° C.) | | 3.0 | | |
| Cyclohexanone (boiling point: 156° C.) | | | 9.0 | |
| Diacetone alcohol (boiling point: 168° C.) | | 3.5 | | |
| Silane coupling agent | 0.5 | 2.0 | 0.5 | |
| Type of coloring agent, etc. | Carbon black | Quinacridone pink | Quinacridone pink | Phthalocyanine blue |
| Composition of coloring agent | 9.5 | 15.0 | 3.5 | 15.0 |
| Photoinitiator | | | | |
| Surface tension adjustor, antifoaming agent, and additives such as leveling agent, etc. | 5.0 | 5.0 | 5.0 | 5.0 |
| Silica | 20.0 | 10.0 | 2.0 | 17.0 |
| Talc | 10.0 | 10.0 | | 10.0 |
| <Total component weight ratio> | 100.0 | 100.0 | 100.0 | 100.0 |
| Surface tension of ink [dyn/cm] | 36.0 | 32.0 | 23.0 | 36.0 |
| Surface tension of glass substrate as object to be printed | 65.0 | 58.0 | 65.0 | 30.0 |
| <Physical property values> | | | | |
| Viscosity [Pa · s] | 80.0 | 150.0 | 5.0 | 70.0 |
| TI value [-] | 10.0 | 8.0 | 2.0 | 9.0 |
| Flow value [mm] | 15.0 | 12.5 | 24.0 | 17.0 |
| F60-F45 [mm] | 0.1 | 0.1 | 1.5 | 0.1 |
| Mean particle size of particles in ink [μm] | 30.0 | 25.0 | 15.0 | 15.0 |
| Image edge spreading width of 100 μm lateral fine line [μm] | 1.0 | 0.5 | 30.0 | 3.0 |
| Image edge spreading width of 100 mm square [μm] | 1.0 | 0.5 | 50.0 | 3.2 |

TABLE 1-continued

| <Printed image evaluation> | | | | |
|---|---|---|---|---|
| Evaluation of high-quality/high-definition property of 100 μmφ dot-printed linage | G | G | P | G |
| Evaluation of high-quality/high-definition property of 100 μm lateral fine line-printed image | G | F | P | F |
| Evaluation of high-quality/high-definition property of 100 mm side-square solid image | F | P | P | F |
| Adhesion onto glass substrate | G | G | G | G |

In table 1, VG, G, F, and P mean following state. :
VG: Very Good
G: Good
F: Fair
P: Poor For the ink compositions for screen printing for a glass substrate of the examples and comparative examples, the materials listed in Table 1 were uniformly mixed by stirring using a propeller rotating stirrer, in the mixing ratios (mass %) listed in the same table, and then subjected to 2 passes of a triple roll mill disperser, and each produced ink composition was measured for viscosity, TI value, flow value (F60), F60–F45 value and surface tension by the methods described above.

For measurement of the surface tension, there may be used a "Model CBVP-Z automatic surface tension meter by Kyowa Interface Science Co., Ltd."

The wetting index on surfaces of solid materials such as surface base materials were measured according to JIS K 6768:1999

Next, the ink compositions for screen printing for a glass substrate of the examples and comparative examples were screen printed onto the glass listed in Table 1 with a screen printing plate (emulsion thickness: 15 μm, flat-processed on emulsion surface), produced using an HS-D360 by Asada Mesh Co., Ltd. (mesh filament diameter: 25 μmφ, calendered mesh thickness: 29 μm, open area ratio: 42%, strength index: 2.56 as indicated by Asada Mesh Co., Ltd.). The screen printing conditions were "a squeegee with an 80 degree hardness, a clearance of 5 mm, pressing with a squeegee printing pressure of 1.5 mm, a squeegee angle of 75 degrees, a squeegee speed of 400 mm/sec and pressing with a scraper pressure of 1.5 mm."

The screen printing plate was one having a printed image design comprising a 100 μmφ dot pattern, a 100 μm longitudinal fine line pattern parallel or perpendicular to the printing direction, a fine crevice pattern that was parallel or perpendicular to the printing direction and had spacings of 150 μm, and a square solid pattern with 100 mm sides. However, sections of the 100 mm solid pattern were also adjacent across the 150 μm spacings, and the sections with smallest spacings were 100 μmφ dot pattern design sections aligned across 30 μm spacings.

The width of spreading at the image edges after the ink compositions for screen printing for a glass substrate of the examples and comparative examples were printed was measured by measuring the spacings between the printed lateral fine lines, at printed coating film image sections printed with the lateral fine line pattern with a line width of 100 μm and the 100 mm square solid pattern, being perpendicular to the printing direction and having 150 μm spacings in the screen printing plate, and then calculating the difference from the printing plate design value of 150 μm. For example, when the spacings between the printed lateral fine lines were 140 μm, the difference from the printing plate design value of 150 μm was 10 μm, but since the image edges are on both sides of the lateral fine lines, so that the spreading width at the image edges on one side is 5 μm, and therefore this was recorded as the "spreading width at the image edges."

The measurement results for the spreading width at the 100 μm lateral fine line image edges adjacent across 150 μm spacings and the measurement results for the spreading width at the edges of the 100 mm square images adjacent across 150 μm spacings, printed with printing ink of the invention, were excellent results that were almost equivalent results to those of the examples described below.

Evaluation of the high-quality/high-definition property of the printed images was made as follows based on direct visual and 200× magnified observation with a digital microscope. The evaluation was conducted for 20th printed object.
Evaluation of [High-Quality/High-Definition Property of 100 Limp Dot-Printed Image]

VG: Absolutely no defects such as chipping in 100 dot shapes, and no loss of spacings between each of the dots.

G: Fine chipping, bleeding or shape distortion of 1 to 5 dots out of 100, but no loss of spacings between each of the dots, and at a level with no problems for practical use.

F: Chipping, bleeding or shape distortion of 6 to 30 dots out of 100.

P: Abnormalities in 31 or more dots out of 100.
Evaluation of [High Quality/High Definition Property of 100 μm Lateral Fine Line-Printed Image]

VG: Enlargement of less than 5 μm, absolutely no defects such as distortion, bleeding or chipping.

G: Approximately 5-10 μm enlargement or thinning, but no loss due to bleeding or chipping.

F: Not less than 11 μm enlargement or thinning.

P: Chipping of fine lines.
Evaluation of [High Quality/High Definition Property of 100 mm-Side Square Solid Pattern]

VG: Printed image with satisfactory leveling property and smoothness, and image edge spreading width of not more than 10 μm.

G: slightly inferior leveling property but within allowable range for practical use, and image edge spreading width of not more than 10 μm.

F: Leveling property within allowable range for practical use, but printing abnormalities occurred, or image edge spreading width exceeded 10 μm.

P: Poor leveling property and unsuitable for practical use, with printing abnormalities also present, or image edge spreading width exceeding 10 μm.
[Adhesion of Images onto Glass Substrates]

G: Absolutely no peeling in 100/100 grid crosscut cellophane tape peeling test.

P: Peeled sections produced in 100/100 grid crosscut cellophane tape peeling test.

Using the ink composition of Example 1 for screen printing of a black matrix grid with a 200 μm line width, black stripe lines with 150 μm line widths, and an image comprising both a 100 mm square solid pattern and 100 μm fine lines as a test pattern, high quality/high-definition screen printed matter was obtained with no defects such as bleeding or chipping, and there were also no problems of adhesion onto glass substrates.

Also, when the ink composition of Example 2 was used for printing of an image comprising both a resist pattern including 100 μm line widths and a 100 mm square solid pattern for testing, high-definition screen printed matter was obtained with no loss such as bleeding or chipping, and there were no problems of adhesion onto glass substrates.

Also, with the ink compositions of Examples 3 to 5, it was possible to accomplish high quality and high definition printing of a character graphic image comprising a 5 cm-square solid pattern and 100 μm dots, and a 100 mm square solid pattern and 100 μm fine lines for testing, and there were also no problems of adhesion onto glass substrates.

Also, with the ink composition of Example 6, it was possible to carry out high quality/high definition printing of an image comprising a decorative hairline pattern for a high quality/high-definition household electrical appliance panel, and a 100 mm square solid pattern and 100 μm fine lines for testing, and there were also no problems of adhesion onto glass substrates.

Also, with the ink composition of Example 7, it was possible to carry out high quality/high definition printing of printed matter comprising a 50 μm dot high quality/high definition spacer pattern, and a 100 mm square solid pattern and 100 μm fine lines for testing, and problems of adhesion onto glass substrates may not be found out.

Also, with the ink composition of Example 8, it was possible to obtain a high quality and high definition silver-metallic character image comprising a 5 cm-square solid pattern and 100 μm dots, and a 100 mm square solid pattern and 100 μm fine lines for testing, and there problems of adhesion onto glass substrates may not be found out.

The invention claimed is:

1. An ink composition for screen printing for a glass substrate, comprising:
   an ink composition for high-quality/high-definition screen printing that, when producing printed matter by screen printing onto a glass substrate using a 360-mesh screen printing plate formed by a high-strength, non-deforming stainless steel mesh with a filament diameter of 25 μm, produces printed matter with a printed image edge spreading width of not more than 10 μm from image design dimensions of the printing plate,
   the ink composition for screen printing including a solvent which is selected from one or more solvents from the group consisting of butylcellosolve acetate, dialkyl adipate ester, isophorone, 3-methoxy-3-methylbutanol, 3-methoxy-3-methylbutyl acetate, coal tar naphtha with a boiling point of not less than 170° C., diethyleneglycol monoethyl ether, diethyleneglycol monoethyl ether acetate, diethyleneglycol monobutyl ether, triethyleneglycol monobutyl ether, triethyleneglycol monobutyl ether acetate, (meth)acrylate monomer, vinyl ether monomer and amide monomer, with a boiling point of not less than 170° C. at not less than 70 mass % of a total of the solvent,
   the ink composition including one of a prepolymer and polymer with a weight-average molecular weight of not less than 2000 at not less than 2 mass % with respect to a total of the ink composition,
   the ink composition having a viscosity of 5 to 180 Pa·s as measured with a BH-type rotating viscosimeter at 25° C. and a thixotropic index (TI value) of 2.0 to 8.0,
   the ink composition having a measured flow radius value between 13.0 to 24.0 mm after 1 minute from a start of measurement by a flow property measuring method using a spread meter at 25° C. according to JIS K5701-1:2000,
   the ink composition satisfying "F60"–"F45"≤1.0 mm, where "F60" is defined as the measured flow radius value after 1 minute and "F45" is defined as the measured flow radius value after 45 seconds from the start of measurement by the flow property measuring method using the spread meter, and
   the ink composition including a coupling agent compound.

2. The ink composition for screen printing for a glass substrate according to claim 1, wherein a surface tension of the ink composition is 23.0 to 36.0 dyn/cm as the value measured with a liquid surface tension meter.

3. The ink composition for screen printing for a glass substrate according to claim 1, wherein the ink composition includes at least one of a coloring material, extender pigment and filler, and a combination thereof, the coloring material, extender pigment and filler are dispersed in the ink composition with a mean particle size of not more than 35 μm.

4. The ink composition for screen printing for a glass substrate according to claim 1, wherein the ink composition is an ink composition for graphic decorative screen printing.

5. The ink composition for screen printing for a glass substrate according to claim 1, wherein the ink composition is an ink composition for any of screen printing to be used for black matrix, black stripe, resist pattern, spacer and light guiding panel dot formation.

6. The ink composition for screen printing for a glass substrate according to claim 1, wherein the ink composition is printed onto a glass substrate with a measured wetting test solution value of 32.0 to 60.0 dyn/cm.

7. Printed matter produced by the screen printing ink composition for screen printing onto a glass substrate according to claim 1.

8. A method for producing printed matter, comprising the step of producing printed matter by printing the screen printing ink composition according to claim 1 onto a glass substrate by screen printing.

* * * * *